United States Patent [19]

Fone et al.

[11] Patent Number: 5,332,235
[45] Date of Patent: Jul. 26, 1994

[54] MECHANICAL FACE SEALS

[75] Inventors: Christopher J. Fone, Reading; James Gilbert, Amersham; Paul Martin, Slough, all of United Kingdom

[73] Assignee: John Crane UK Limited, United Kingdom

[21] Appl. No.: 909,144

[22] Filed: Jul. 6, 1992

[30] Foreign Application Priority Data

Jul. 24, 1991 [GB] United Kingdom ............... 9115991

[51] Int. Cl.$^5$ .............................................. F16J 15/32
[52] U.S. Cl. ................................. 277/88; 277/93 R; 277/DIG. 6
[58] Field of Search .................... 277/88, 89, 90, 85, 277/93 R, DIG. 6, 92

[56] References Cited

U.S. PATENT DOCUMENTS

| | | | |
|---|---|---|---|
| 2,556,133 | 6/1951 | Bright | 277/89 |
| 2,994,547 | 8/1961 | Dolhun et al. | 277/88 |
| 3,370,856 | 2/1968 | Buske | 277/89 |
| 3,764,150 | 10/1973 | Newkirk | 277/90 |
| 4,558,872 | 12/1985 | Vossieck et al. | 277/88 |
| 4,591,167 | 5/1986 | Vossieck et al. | 277/88 |
| 4,700,954 | 10/1987 | Fischer | 277/DIG. 6 |
| 4,838,560 | 6/1989 | Heilala | 277/88 |
| 5,013,051 | 5/1991 | Hilaris et al. | 277/88 |

FOREIGN PATENT DOCUMENTS

| | | |
|---|---|---|
| 0226845 | 7/1987 | European Pat. Off. . |
| 2503822 | 10/1982 | France . |
| 89/07726 | 8/1989 | PCT Int'l Appl. . |
| 2097072 | 10/1982 | United Kingdom . |

OTHER PUBLICATIONS

C. J. Fone and J. Gilbert, The design and development of a novel low cost elastomeric mechanical seal, 13th Int. conference on fluid sealing Apr. 7-9, 1992; Brugge (Belgium *page 711, line 1-p. 724, line 22*.

Primary Examiner—William A. Cuchlinski, Jr.
Assistant Examiner—Daniel G. DePumpo
Attorney, Agent, or Firm—Davis, Bujold & Streck

[57] ABSTRACT

A mechanical face seal has a first seal face member mounted in fixed rotational and axial relationship and sealed with respect to a housing, and a second seal face member mounted with respect to a shaft by means of an elastomeric bellows unit, the bellows unit being axially compressed so that it urges the second seal face member into sealing engagement with the first seal face member; the elastomeric bellows unit being formed from an elastomeric composition with reinforcing fibres embedded therein, the reinforcing fibres being orientated axially of the bellows unit.

24 Claims, 1 Drawing Sheet

MECHANICAL FACE SEALS

BACKGROUND TO THE INVENTION

The present invention relates to mechanical face seals and in particular to mechanical face seals in which an elastomeric bellows unit provides secondary sealing between one seal face member and its associated component.

In mechanial face seals for providing a seal between a pair of relatively rotatable components, one seal face member is mounted in fixed axial and rotational relationship and sealed with respect to one component while the other seal face member is mounted in fixed rotational relationship and sealed with respect to the other component, but is movable axially thereof. The axially movable seal face member is biased into engagement with the axially fixed seal face member to provide a seal between the engaging faces thereof.

One method of sealing the axially movable seal face member with respect to its associated component is to use an elastomeric bellows unit, one end of which sealingly engages the seal face member and the other end sealingly engages the associated component. The bellows unit may be compressed and expanded axially in order to accommodate axial movement of the seal face member.

Hitherto with seals of this construction in order to achieve sufficient axial compliance, the axial resilience of the bellows unit is low and separate spring means with associated retaining rings have had to be used to bias the seal face members into sealing engagement, for example as disclosed in GB 593,413 and GB 647,587.

In another form of seal, for example as disclosed in GB 2,019,956A, resilient bushes are used to provide a seal between the axially movable seal face member and associated component, compression of the bush serving to axially load the seal face members into sealing engagement. Such bushes will however provide only low axial compliance and the axial load over the operating range will vary considerably.

EP 0,226,845A discloses an elastomeric bellows seal with no separate spring means. The bellows unit of this seal is formed from unreinforced rubber having end portions which sealingly engage a shaft and seal face member, respectively. A relatively thin unsupported intermediate portion is arranged to buckle when the bellows unit is at its working length in order to apply an axial load urging the seal face member into engagement with a seat. With this bellows unit design, when subjected to a pressure differential, this will act on the bellows unit, either side and across the already highly stressed buckled intermediate portion thereof, further stressing this area so that even at relatively low pressure differentials the bellows unit is excessively stressed and liable to split. As a result bellows seals of this construction are limited to use with low pressure differentials up to of the order of 2 bar.

The present invention provides a mechanical face seal with bellows unit which will provide the secondary seal between the axially movable seal face member and associated component and which also applies an axial load urging the seal face members into sealing engagement and is capable of withstanding pressure differentials of the order of 10 bar.

SUMMARY OF THE INVENTION

According to one aspect of the present invention, a mechanical face seal for providing a seal between a pair of relatively rotatable components comprises; a first seal face member mounted in fixed rotational and axial relationship and sealed with respect to one component, and a second seal face member mounted in fixed rotational relationship but movable axially of the other component, said second seal face member being sealed with respect to said other component and urged axially into sealing engagement with the first seal face member by means of an elastomeric bellows unit, the elastomeric bellows unit being formed from an elastomeric composition with reinforcing fibres embedded therein, the reinforcing fibres predominantly being orientated axially of the bellows unit, the bellows unit being axially compressed when at its working length.

The fibre reinforcement of the elastomeric bellows unit will increase the strength and stiffness of the bellows unit while maintaining adequate flexibility. Any suitable reinforcing fibre may be used although these will have to withstand the temperatures, typically 150° C. to 180° C., to which they will be subjected during moulding of the bellows unit. Suitable materials include cotton and fibreglass, although stronger materials such as aramid or carbon fibres are preferred. The elastomeric composition may contain from 1% to 15% by volume or more preferably from 2% to 7% by volume, reinforcing fibre. The fibre length may be from 0.1 mm to 25 mm preferably predominantly from 0.1 mm to 6 mm. The bellows unit may be made of any suitable natural or synthetic rubber composition although nitrile or ethylene propylene rubbers are preferred.

The bellows unit is preferably made using a transfer or injection moulding technique in which the rubber composition with fibre reinforcement is extruded axially into the mould, so that the fibres will be aligned to the required orientation.

The bellows unit used in the present invention will have end formations for engagement of the seal face member and associated component respectively. The end formations are interconnected by an axially compressible convoluted section. The convoluted section is preferably of "Z" shape having a pair of substantially axially extending portions one connected to each of the end formations, the axially extending portions being interconnected by a radially extending portion disposed at an acute angle to the two axially extending portions. Preferably the angle between the radially extending portion and each axially extending portion of the convoluted section is from 50° to 70°, the angles being radiussed, particularly where radial clearance is limited, for example where the seal is located in a stuffing box such as those covered by ISO 3069. Where greater radial clearance is available larger angles could be used.

When at its working length, the convoluted section is compressed so that the convolutions are substantially closed.

Clamping means may be provided round the end formations of the bellows unit to compress these formations into engagement with the seal face member and associated component. The seal face member may be moulded from carbon or sintered ceramic material. In order to avoid the need to machine to close tolerances the face engaged by the bellows unit, corrugations may be provided in the end portion of the bellows unit engaging the seal face member in order to provide compliance therein.

BRIEF DESCRIPTION OF THE DRAWINGS

An embodiment of the invention is now described, by way of example only, with reference to the accompanying drawings in which.

DESCRIPTION OF A PREFERRED EMBODIMENT

Figure 1:
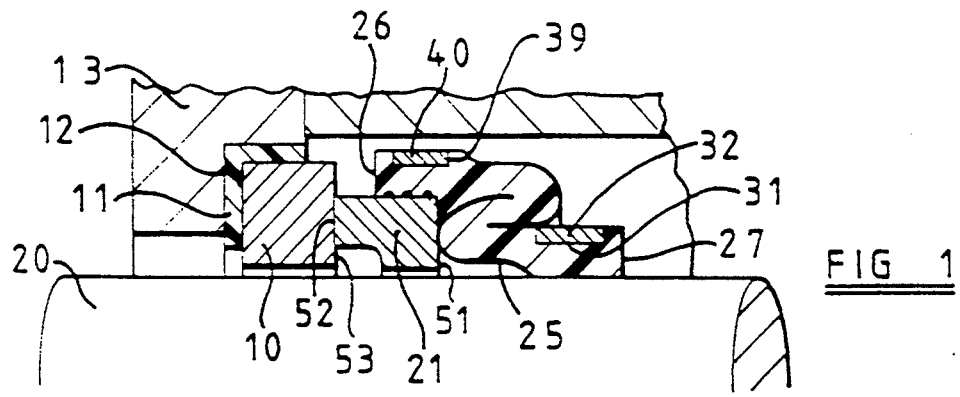
FIG. 1 illustrates in sectional elevation a seal in accordance with the present invention, at working length.

As illustrated in FIG. 1, an annular seal face member or seat 10 is located in a recess 12 in a housing 13, an elastomeric cup 11 being interposed therebetween to provide a seal. The seat 10 and elastomeric cup 11 are a press fit in the recess 12 so that they are fixed rotationally and axially with respect to the housing 13.

The seat 10 surrounds a shaft 20 which is rotatable with respect to the housing 13. A second seal face member 21 is mounted upon the shaft 20, the seal face member 21 being secured to one end 26 of the bellows unit 25 the other end 27 of the bellows unit 25 being secured to the shaft 20.

Figure 2:
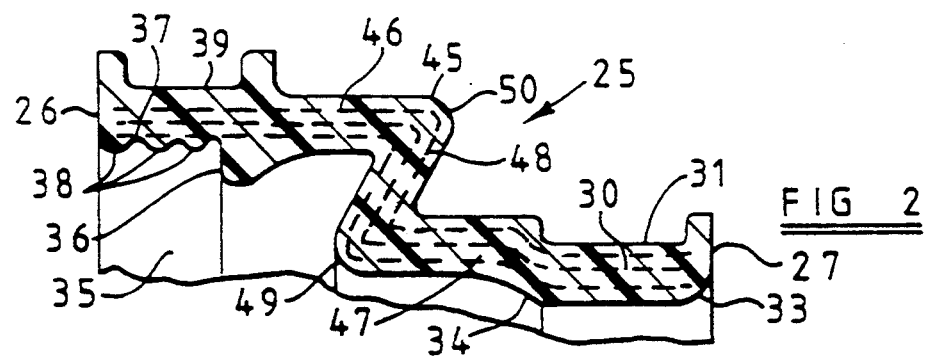
FIG. 2 illustrates in sectional elevation the bellows unit used in the seal illustrated in FIG. 1, in its uncompressed condition.

The bellows unit 25 which is illustrated in greater detail in FIG. 2, is moulded from a nitrile rubber composition containing 3.4% by volume of aramid reinforcing fibres from 0.1 mm to 25 mm in length, at least 50% of the fibres being between 0.2 mm and 2 mm in length. The bellows unit 25 is moulded using a transfer moulding technique in which the rubber composition with fibre reinforcement is extruded axially into the mould, thereby aligning the fibres so that they are orientated axially of the mould. The rubber composition is then cured at 165° C.

The bellows unit 25 has a reduced diameter tubular formation 30 at end 27, the inside diameter of the tubular portion 30 being an interference fit on the shaft 20. A circumferential recess 31 is provided on the external diameter of tubular portion 30 for a metal or plastic clamping ring 32, which will compress the rubber composition onto the shaft 20 so that torque may be transmitted between the shaft 20 and bellows unit 25. The tubular portion 30 has a radiussed lead-in portion 33 and angled portion 34 to facilitate insertion of the shaft 20.

The opposite end 26 of the bellows unit 25 defines an enlarged diameter socket formation 35, for engagement of the external diameter of the seal face member 21. The socket formation 35 has a radially extending shoulder portion 36 which locates the seal face member 21 axially with respect to the bellows unit 25. Ribs 38 are provided on the internal diameter 37 of socket formation 35 to provide compliance, so that a seal will be produced with the seal face member 21, even if the engaging surface of the seal face member 21 is not machined to close tolerances. A circumferential groove 39 is provided in the external diameter of socket formation 35 for a metal or plastic clamping ring 40.

The tubular formation 30 and socket formation 35 of the bellows unit 25 are interconnected by a convoluted section 45 of "Z" section. The convoluted section 45 has a pair of axially extending portions 46 and 47 interconnected by an intermediate radially extending portion 48. The intermediate portion 48 is disposed at 60° to each of the axially extending portions 46 and 47, the crowns 49 and 50 defined thereby being radiussed on both their internal and external surfaces.

As illustrated in FIG. 1, when the seal is assembled and the bellows unit 25 is at its working length, the convoluted section 45 is compressed so that the convolutions between portions 46 and 48 and portions 48 and 47 are substantially closed. In this position, the crown 49 abuts the rear face 51 of seal face member 21 to assist in supporting and maintaining location of face member 21 and bellows unit 25, to urge the seal face member 21 into sealing engagement with seat 10. The fibre reinforcement of the bellows unit 25 will improve the strength of the bellows unit 25 whilst maintaining adequate flexibility, so that sufficient loading may be maintained over the working life of the seal, without assistance from separate spring means. The fibre reinforcement will also improve the bellows capability to withstand pressure differentials across the seal. This improved performance is further enhanced by the substantially closed convolutions, which effectively reinforce one another when subjected to substantial pressure differentials, for example of the order of 10 bars. The seal disclosed above is also axially compact as compared with other forms of bellows seal.

The end of the seal face member 21 defining a seal face 52 which engages face 53 of the seat 10 is of increased internal diameter, while the diameter at the opposite end 51 is a close clearance fit with the shaft 20. The seal face member 21 will thus be located concentrically by the shaft 20 while being free to move axially thereof. This will provide radial stability for the seal face member 21 which would otherwise be free to oscillate radially if only supported by the flexible bellows unit 25, this being an important criteria for operation at these design pressures.

Figure 3:
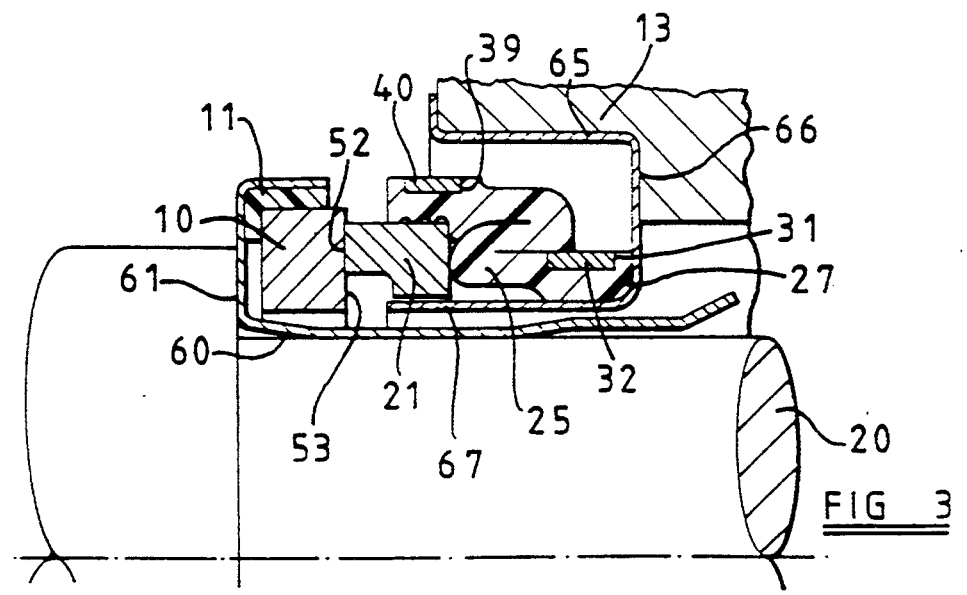
FIG. 3 illustrates in sectional elevation an alternative form of seal in accordance with the present invention.

In the embodiment illustrated in FIG. 3, the seat 10 is located in a retaining ring 60 and is sealed with respect thereto by means of elastomeric cup 11. The retaining ring 60 is a press fit on the shaft 20 so as to be fixed rotatably with respect thereto and is located axially of the shaft 20 by abutment against a shoulder 61 thereon.

The bellows unit 25 and seal face member 21 are located in a retaining ring 65 which is a press fit within a recess 66 in the housing 13, the bellows unit 25 sealingly engaging an inner cylindrical wall 67 of the retaining ring 65. The internal diameter of the seal face member 21 at the end remote from the sealing face 52 thereof being a close clearance fit with the inner wall 67 of the ring 65 to provide radial stability.

This embodiment of the seal functions in the same manner as that described with reference to FIGS. 1 and 2, the axially movable seal face member 21 is however fixed rotationally while the seat 10 rotates with the shaft 20.

We claim:

1. A mechanical face seal for providing a seal between a pair of relatively rotatable components comprising a first seal face member mounted in fixed rotational and axial relationship and sealed with respect to one component, a second seal face member mounted in fixed rotational relationship but movable axially of the other component, said second seal face member being sealed with respect to said other component and permanently urged axially into sealing engagement with the first seal face member solely by means of an elastomeric bellows unit, the elastomeric bellows unit defining an axially compressible convoluted section comprising a pair of axially extending portions, one axially extending portion being spaced radially of the other axially extending portion, the axially extending portions being interconnected by a radially extending portion, the radially extending portion being disposed at an acute angle to each axially extending portion, the bellows unit being formed from an elastomeric composition with reinforcing fibres embedded therein, the reinforcing fibres being orientated axially of the bellows unit, and the bellows unit being axially compressed when at its working length.

2. A mechanical face seal according to claim 1 in which the radially extending portion is inclined to the axially extending portions at an angle of from 50° to 70° when the bellows unit is not in compression.

3. A mechanical face seal according to claim 1 in which crowns formed at the junction of the axially extending portions and radially extending portion are radiussed on their internal and external surfaces.

4. A mechanical face seal according to claim 1 in which the convoluted section is compressed so that the convolutions are substantially closed, when the bellows unit is at its working length.

5. A mechanical face seal according to claim 4 in which the crown of one convolution abuts the rear face of the second seal face member when the bellows unit is at its working length.

6. A mechanical face seal according to claim 1 in which the bellows unit defines a tubular portion at one end, for engagement about a cylindrical surface of the associated component and a socket portion adjacent the other end for engagement of an outer cylindrical surface of the second seal face member.

7. A mechanical face seal according to claim 6 in which the socket portion is provided with a series of circumferential ribs on its internal diameter, the ribs being compressed to form a seal with the second seal face member.

8. A mechanical face seal according to claim 1 in which the bellows unit is formed from a natural rubber composition.

9. A mechanical face seal according to claim 1 in which the reinforcing fibres are capable of withstanding temperatures in excess of 150° C.

10. A mechanical face seal according to claim 9 in which the reinforcing fibres are aramid fibres.

11. A mechanical face seal according to claim 1 in which the bellows unit is formed from a composition containing from 1% to 15% by volume of reinforcing fibres.

12. A mechanical face seal according to claim 11 in which the bellows unit is formed from a composition containing from 2% to 7% by volume reinforcing fibres.

13. A mechanical face seal according to claim 1 in which the reinforcing fibres are from 0.1 mm to 25 mm long.

14. A mechanical face seal according to claim 13 in which the reinforcing fibres are predominantly from 0.1 mm to 6 mm long.

15. A mechanical face seal according to claim 1 in which the bellows unit is made using a moulding technique in which an elastomeric composition with fibre reinforcement is extruded axially into a mould.

16. A mechanical face seal according to claim 15 in which the bellows unit is formed using a transfer or injection moulding technique.

17. A mechanical face seal according to claim 1 in which the first seal face member is mounted on a housing and the second seal face member is mounted with respect to a shaft for rotation therewith by means of the bellows unit.

18. A mechanical face seal according to claim 1 in which the first seal face member is mounted for rotation with a shaft and the second seal face member is mounted with respect to a housing by means of the bellows unit.

19. A mechanical face seal according to claim 18 in which the first and second seal face members are mounted with respect to the shaft and housing respectively by means of retaining rings which are press fits on the shaft and housing.

20. A mechanical face seal according to claim 1 in which one of the axially extending portions of the bellows unit defines an end formation which sealingly engages the second seal face member and the other axially extending portion of the bellows unit defines an end formation which sealingly engages the associated component.

21. A mechanical face seal according to claim 1 in which the bellows unit is formed from a synthetic rubber composition.

22. A mechanical face seal according to claim 21 in which the bellows unit is formed from an ethylene propylene rubber composition.

23. A mechanical face seal according to claim 21 in which the bellows unit is formed from nitrile rubber composition.

24. A mechanical face seal according to claim 9 in which the reinforcing fibres are carbon fibres.

* * * * *